United States Patent
Michalski et al.

(10) Patent No.: US 6,731,991 B1
(45) Date of Patent: May 4, 2004

(54) SYSTEM FOR PROJECTING LIGHT ON A WORK SURFACE TO PRODUCE AN IMAGE FOR TRACING

(75) Inventors: Michael Michalski, Greenfield, WI (US); Christopher J. Stuart, Greendale, WI (US); Dennis D. Holpfer, Milwaukee, WI (US)

(73) Assignee: Laser Force, Inc., Milwaukee, WI (US)

(*) Notice: Subject to any disclaimer, the term of this patent is extended or adjusted under 35 U.S.C. 154(b) by 792 days.

(21) Appl. No.: 09/619,686

(22) Filed: Jul. 19, 2000

Related U.S. Application Data (60) Provisional application No. 60/144,601, filed on Jul. 19, 1999.

(51) Int. Cl.[7] .............................................. G05B 19/18
(52) U.S. Cl. .......................... 700/59; 700/58; 700/62; 700/64; 700/195; 382/276; 382/277; 382/282; 353/18; 353/27 R; 353/27 A; 359/22; 359/28; 359/32; 359/34
(58) Field of Search ......................... 700/56–57, 58, 700/59, 60, 61, 62, 64, 63, 195; 353/18, 19, 21, 22, 23, 24, 25, 27 R, 27 A, 28–30, 34, 79, 100–101; 359/22, 28, 30, 32–34; 382/276–277, 278, 282

(56) References Cited

U.S. PATENT DOCUMENTS

| | | | |
|---|---|---|---|
| 4,502,147 A | 2/1985 | Michaels | 378/206 |
| 4,628,466 A | * 12/1986 | Tymes | 347/231 |
| 5,341,183 A | 8/1994 | Dorsey-Palmateer | 353/122 |
| 5,381,258 A | 1/1995 | Bordignon et al. | 359/202 |
| 5,388,318 A | 2/1995 | Petta | 29/407 |
| 5,430,662 A | 7/1995 | Ahonen | 364/512 |
| 5,576,901 A | 11/1996 | Hanchett | 359/877 |
| 5,663,885 A | 9/1997 | Stahl | 364/470.05 |
| 5,757,500 A | 5/1998 | Rueb | 356/375 |
| 5,848,198 A | * 12/1998 | Penn | 382/276 |
| 5,969,725 A | * 10/1999 | Fujiki et al. | 345/619 |
| 6,000,801 A | * 12/1999 | Dillon et al. | 353/28 |
| 6,051,179 A | * 4/2000 | Hagenau | 264/401 |

* cited by examiner

Primary Examiner—Ramesh Patel
(74) Attorney, Agent, or Firm—Boyle, Fredrickson, Newholm, Stein & Gratz, S.C.

(57) ABSTRACT

A method and system of projecting light on a planar surface to produce an image for tracing is disclosed. The system includes a projector that has a light source and a signal conditioner that is operably connected to the projector. A computer is operably connected to the signal conditioner. A scanner is connected to the projector. A test pattern from the computer is projected from the projector through the scanners to visually align an image to a sector on a work surface. A grid is operably aligned with the work surface. A geometric pattern from the computer is then projected by the projector on the planar work surface for tracing. The method comprises the steps of creating a pattern, tracing lines along the pattern on the planar work surface, cutting the pattern along the traced lines, discarding pieces of the planar surface outside the pattern, and placing edging along an outer edge of the pattern.

20 Claims, 10 Drawing Sheets

SYSTEM FOR PROJECTING LIGHT ON A WORK SURFACE TO PRODUCE AN IMAGE FOR TRACING

CROSS REFERENCE TO RELATED APPLICATIONS

This application claims priority on application U.S. Ser. No. 60/144,601, filed on Jul. 19, 1999.

BACKGROUND OF THE INVENTION

1. Field of the Invention

The present invention relates in general to the fields of building construction and interior decorating. More particularly, the present invention relates to a system and method for projecting light on a work surface to produce an image for tracing. Specifically, a preferred embodiment of the present invention relates to expediting the construction and installation of modular structures.

2. Discussion of the Related Art

Traditional means of constructing geometric designs and constructing and installing modular structures with edge detail required a multiple person crew. Extensive man hours were wasted tediously pre-assembling the entire structure on the floor, mounting and dismounting the structure and the edge detail to make it fit the work surface, aligning the structure in the air, and then raising it and holding it in place for final installation. During some installations, crew members could also take portions of the edge detail and mark points on the modular structure in order to define the perimeter of the finished pattern. These procedures also often ultimately relied on in the air adjustments which at times compromised the intended integrity of the patterns.

Moreover, pre-assembly on the ground limited the size of the structure which could be safely raised. Larger patterns would be too awkward to be raised by a practically sized crew of two or three people. Any additional laborers also have the disadvantage of relatively high cost.

As the construction industry is a competitive business, a preferred solution will be seen by the end-user as being cost effective. A solution is cost effective when it is seen by the end-user as compelling when compared with other potential uses that the end-user could make of limited resources.

Historically, it was known in the prior art to use of light sources of the type hereunder consideration, such as lasers, to aid in building construction. For example, lasers used for leveling are well-known to those skilled in the art. Further, the construction of trusses by following a projected pattern has been used previously in the construction industry. This process will be discussed in greater detail below. However, the use of these lasers in construction applications does not generally involve very complex patterns.

The below-referenced U.S. patents disclose embodiments that were at least in part satisfactory for the purposes for which they were intended. The disclosures of all the below-referenced prior U.S. patents in their entireties are hereby expressly incorporated by reference into the present application for purposes including, but not limited to, indicating the background of the present invention and illustrating the state of the art.

U.S. Pat. No. 5,430,662, entitled "Laser Projection System for Truss Manufacturing," discloses a laser-enhanced design system for truss manufacturing. Lasers mounted on a ceiling project images onto a table below. The initial truss design is produced using a CAD system in conjunction with a work station or PC-microcomputer. A standard PC-microcomputer running MS-DOS software is used to control the laser system. Files required for the laser system are automatically created during the designing phase. An assembly line operator uses a mouse or keyboard to control and select the projected images while a worker places the truss elements over the projected images.

U.S. Pat. No. 5,388,318, entitled "Method for Defining a Template for Assembling a Structure," reveals a system for generating a template for use in assembling a structure such as a truss. One or more laser scanners mounted above a work surface are controlled by a computer to generate a scanning laser image of all or a portion of the structure. The computer receives data describing the relative location of the individual work pieces in their assembled positions and the position of the laser scanner relative to the work surface. The computer generates a set of template defining data which is converted to a control signal and transmitted to the laser scanner.

U.S. Pat. No. 5,663,885, entitled "Procedure and Device for Processing Cutting Material," discloses a procedure for optimizing the processing of cutting material, such as textiles, leather and technical fabrics and the like, as well as to a device to perform the procedure. As shown in U.S. Pat. No. 5,663,885, the cutting patterns (T1, T2, T3) are first contained in the main memory of a computer (1) and then are selected. The selected patterns are projected on a cutting material on a working surface (AF) in their original size by means of direct laser projection, possibly with different colors, and are also projected on a control panel (4) in a scaled down size. The laser projections of the individual patterns are then interlocked on the cutting material by means of a control unit (5) actuated by an operator (P) positioned next to the cutting material. The patterns are interlocked to optimize use of the cutting material by accounting for the conditions of the cutting material, such as defective spots (F1, F2, F3, F4), and the shape of the cutting material. Once the patterns are finally positioned, data on these positions is then transmitted to a cutting unit, such as an automated cutter (C), by an instruction given by the operator and the citing operation is triggered.

U.S. Pat. No. 5,381,258, entitled "Laser Projector for Projecting an Image Onto a Curvilinear Surface," discloses a laser projection system for projecting an image onto a surface comprises a laser projector operably connectable to a computer. The computer controls the operation of the system. The laser projector comprises a laser beam source for generating a laser light beam, a collimator comprising a focusing lens for focusing the laser light beam to a focal point, a collimating lens for collimating the laser light beam beyond the focal point and a wedge-shaped lens having an apertured interposed between the focusing lens and collimating lens. The aperture has a size for passing the laser light beam therethrough. Two scanners direct the light beam about a light path. A photo sensor receives light refracted by the wedge-shaped lens and generates a feedback signal. A plurality of target reflectors, each having a retroreflective material for retroreflecting light back to its source. The laser light beam is projectable in a predetermined pattern and if the laser light beam is retroreflected back to the laser light source, the retroreflected laser light beam is refracted by the wedge-shaped lens towards the photo sensor for generating a feedback signal for the computer. The plurality of target reflectors comprises a plurality of mountable targets for removably mounting on the surface. Upon striking the mountable targets with the laser beam, the photo sensor generates a plurality of feedback signals for establishing spatial coordinates of the mountable targets. The plurality of target reflectors further comprises a moveable target for inserting in the light path of the laser beam while projecting the image. Upon striking the moveable target with the laser beam, the photo sensor generates a feedback signal for limiting the area of projection of the image.

U.S. Pat. No. 5,341,183, entitled "Method for Controlling Projection of Optical Layup Template," reveals a projection system having a process utilizing three-dimensional data, thereby allowing the system to account for rotational and translational differences between the projector and the object upon which the laser light is directed. Reference sensors located on the object are in a known relationship to the three-dimensional data set to be projected, i.e., the reference sensors utilize the same coordinate system as the three-dimensional data set.

U.S. Pat. No. 5,757,500, entitled "Calibration System for Large Tooling Fixtures," discloses a method for determining the position of a laser projector relative to a large tool which includes the use of posts having several reference points. A rotating tool is preferably also provided with a plurality of reference points. At least two of the reference points are spaced by a known distance. By identifying the location of the reference points, a control for the system is able to calibrate where the reference points are relative to the laser projectors. In this way, the laser projector is able to calibrate itself relative to the reference points on the large tool. The system initially determines the position of the reference points based upon known distances between the reference points.

U.S. Pat. No. 5,576,901, entitled "DC Motor Actuator for Light Modification," discloses a light system which includes a laser light generator and an array of motor-driven mirrors aligned to deflect a beam of laser light in various directions to create a light show. The motors are operated in a controlled sequence by a motor controller. The motors are small DC permanent magnet motors which are driven from a DC source whose voltage is adjustable to vary the frequency of oscillation of the motors and, hence the mirrors. Connected to each motor is a small coil spring whose coil is carried on the motor shaft and which has two extended arms, one of which is secured to a nearly stationary member and one which is secured to the mirror shaft. The mirror shaft is movable between two stops. The spring acts to oppose the direction of motion of the motor such that the motor is normally stalled out and driven back to one of the stops before it can be moved for enough to impact the other stop.

U.S. Pat. No. 4,502,147, entitled "Means for Visually Indicating an X-Ray Field," discloses a visual indicator for an X-ray field which includes a light generator providing a beam of light. The light is provided to a first mirror that moves about an axis normal to the beam of light to deflect the beam. The deflected beam is applied to a second mirror that moves about an axis normal to the first axis and applies the beam of light to a mirror on the axis of the X-ray beam for reflection onto the X-ray field. The mirrors are controlled by signals indicative of the field defining collimator leaves to cause the light beam to trace out the field defining by the collimator leaves.

In one prior system, diode light sensors are used to align a structure to a laser projection coming from a projector mounted on a ceiling onto a gantry table. The table position is fixed. The projector and table never move. Whereas, for some particular jobs a system may be needed to cover an area (such as a ceiling) spanning thirty thousand square feet. Moreover, when one job is over, the system may be needed at another job site fifty miles away or a thousand miles away.

Therefore, what is needed is a portable system which can be easily transported to another job. What is also needed is system which is able to project its own reference grid pattern onto the work surface (such as a ceiling) and can be easily aligned visually.

SUMMARY AND OBJECTS OF THE INVENTION

By way of summary, the present invention is directed to a system which brings accuracy and time savings to outlining a pattern for use in applications such as the construction and installation modular structures having edge trim detail. Preferably, this is accomplished by projecting an image of light onto a work surface. This light or laser projection system is compact and portable to allow mobility and flexibility when working within an occupied or active work environment.

Initially, a pattern or design is created by a designer, an artist, or architect. The design is then converted into a wire frame drawing file using any popular computer aided design (CAD) or bitmap drawing (BMP) software and a PC-based or Apple® Macintosh® based computer. The computer may be used to run both the CAD or BMP software and laser projection conversion software. The drawing file of the pattern is then dissected into workable sections. This dissection is necessary because of the limited available distance between the laser projector and the work surface at the installation site.

Next, the laser projection software loaded in the computer encodes the drawing file into a laser data file format. The software, aided by a specialized computer card, converts this digital laser data file information into an analog signal for output. The analog signal is then transmitted to a geometric signal conditioner. The geometric signal conditioner then transmits the analog signal to a laser projector. These analog signals control the positioning of scanners within the laser projector and the modulation of the laser light by on/off switching.

As the light projector emits an output image onto the work surface, the operator may physically move the projector into an optimal projection position. The "optimal position" is in part defined by physical landmarks preferably identified during a site survey conducted at the installation location. Once this optimal positioning is roughed in, a second image is projected onto the work surface. This second image or target image is a grid pattern used to fine-tune the image's, and eventually the pattern's, precise alignment. A geometric signal conditioner is used for this procedure. The geometric signal conditioner is an electronic signal processor that modifies vector-scanning signals to compensate for oblique projection angles, non-planar surfaces, and scanner misalignment. Once the grid is visually aligned, the converted CAD file is loaded on to the computer and on to a specific sector of the pattern. That portion of the pattern is then projected onto the work surface.

The projected pattern image is then traced (usually by hand) onto the work surface. The projector may then be physically moved to the next sector. The projection of another test pattern allows the operator to once again roughly align the projector into place. The alignment grid is again manually or electronically fine-tuned with the geometric signal conditioner so that the next sector of the pattern is properly projected for tracing. Alternatively, multiple projectors can be simultaneously used to project the entire pattern upon the work surface for tracing.

An effect of the present invention is to provide greater placement accuracy during the installation of certain modular structures. Another object of the invention is to provide an apparatus that allows for dial-in placement accuracy of structures in near real-time, unlike the projection through a lens which cannot easily correct for unforeseen work site problems. Yet another object of the invention is to provide a system that is ruggedized and reliable, thereby decreasing down time and operating costs. Another object of the invention is to provide a system that has one or more of the characteristics discussed above but which is relatively simple to manufacture and assemble using a minimum of equipment. Still another object of the invention to provide an apparatus which is very mobile and easily transported from construction site to construction site.

Another object of the invention is to provide a system that incorporates many physical labor saving steps. Yet another object of the invention is to provide a system that is predictable and reproducible, thereby decreasing the possibility of variance and reducing overall operating costs. Another object of the invention is to provide a system that has one or more of the characteristics discussed above, but which is relatively simple to setup and operate.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

For purposes of this description, a laser (light amplification by stimulated emission of radiation) is a device that utilizes the natural of atoms or molecules between energy levels for generating coherent electromagnetic radiation in the ultraviolet, visible, or infrared regions of the spectrum.

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

The present invention and the various features and advantageous details thereof are explained more fully with reference to the non-limiting embodiments described in detail in the following description.

1. System Overview

The present invention comprises a system of projecting light on a planar surface to produce an image for tracing comprising the steps of: creating a pattern; providing a projector having a light source; a signal conditioner operably connected to the projector (computer or otherwise); a computer operably connected to the signal conditioner; a scanner operably connected to the projector; a test pattern emanating from the projector for visually aligning an image to a sector; a grid operable aligned with the planar surface; and a geometric pattern projected on the planar surface; tracing lines along the pattern on the planar surface; cutting the pattern along the traced lines; discarding pieces of the planar surface outside the pattern; and placing edging or some other material along an outer edge of the pattern.

2. Detailed Description of Preferred Embodiments.

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Figure 1:
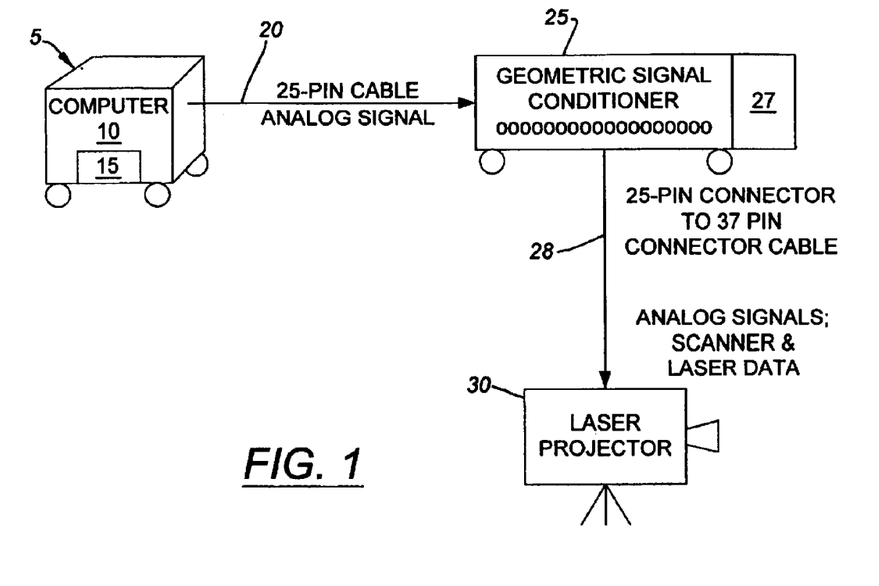
FIG. 1 is a schematic diagram which illustrates the system of the present invention.

Referring to FIGS. 1–13, system 5 is made up of a variety of components (including hardware and software) and steps. Referring to FIG. 1, a schematic is used to show system 5 and some of its important components. In FIG. 1, system 5 is comprised of computer 10 which is preferably an IBM® compatible desktop PC computer having (at a minimum) an Intel® Pentium II® processor. Computer 10 contains at least hardware card or board 15 having a processor and a memory. Preferably, the board 15 is a specialized board known as a Pangolin Quad Mod 40 hardware card or board or any other board or created software of this kind. This board 15 and its related software allow system 5 to convert digital signals to analog signals.

Computer 10 via cable 20 is connect to geometric signal conditioner 25. Cable 20 preferably as a 25 pin connector at one end. Cable 20 is used to carry the analog signal between the computer and the geometric signal conditioner. In one embodiment, the signal conditioner may internally co-located the Pangolin board 15.

Geometric signal conditioner 25 contains a geometric correction card 27, known as a Universal Geometric Card (UGC), which allows for fine-tuning of being projected laser light. Preferably, geometric signal conditioner 25 and geometric correction card 27 are obtained from Laser Systems Design International. A cable 28 having a 25 pin connector on one end and 37 pin connector on the other end connects geometric signal conditioner to projector 30.

Figure 2:
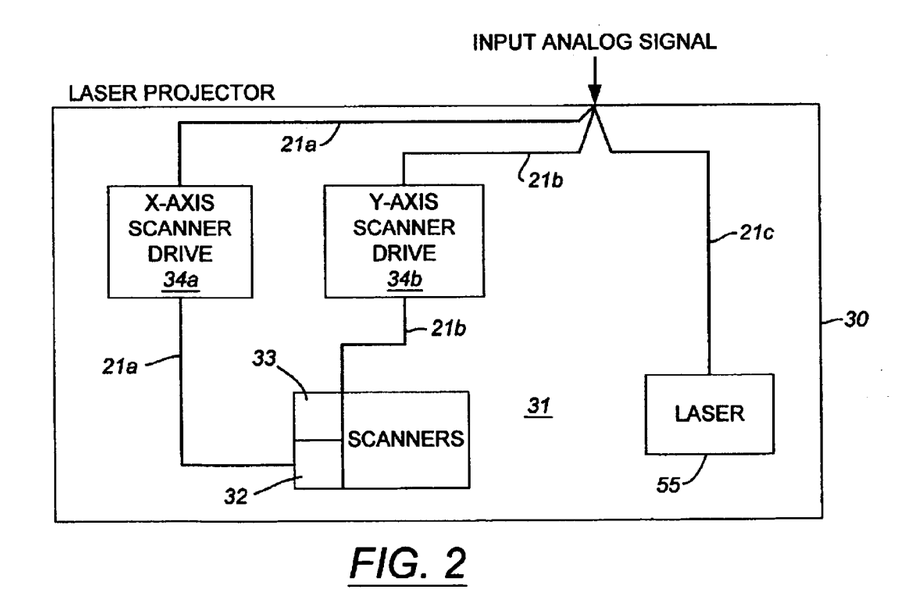
FIG. 2 is a block diagram which generally illustrates the light projector according to the system present invention shown in FIG. 1.

Projector 30 is preferably a portable laser projector that can be easily packed up and moved from job site to job site. Referring now to FIG. 2, it should be noted that projector 30 is represented in block diagram form for improved clarity. Although the preferred embodiment shown in FIG. 2 includes two scanners, a x-axis scanner driver, a y-axis scanner driver, and a laser, it is within the level of ordinary skill in the art having knowledge of the invention disclosed herein to use other components to accomplish the same functions. For example, variety of light sources other than lasers may be used as may other solid state scanning devices.

As shown in FIG. 2, located within the projector 30 and mounted on projector base plate 31 are x-axis scanner 32 and y-axis scanner 33. These scanners 32, 33 are preferably 6800HP Cambridge x-axis and y-axis scanners or their equivalents and are available through Cambridge Technology, Inc. of Cambridge, Mass. Scanner drivers 34a, 34b provide power to the scanners 32, 33. These drivers 34a, 34b are also available from Cambridge Technology, Inc. FIG. 2 shows a first set wires 21a connected to x-axis scanner 32. A second set of wires 216 is connected to y-axis scanner 33. A third set of wires 21c is connected to light source 55 which is preferably a laser. These wire sets carry an input analog signal from geometric signal conditioner 25 to projector 30 so that projector 30 can emit light from light source 55 onto the work surface (not shown).

Figure 3:
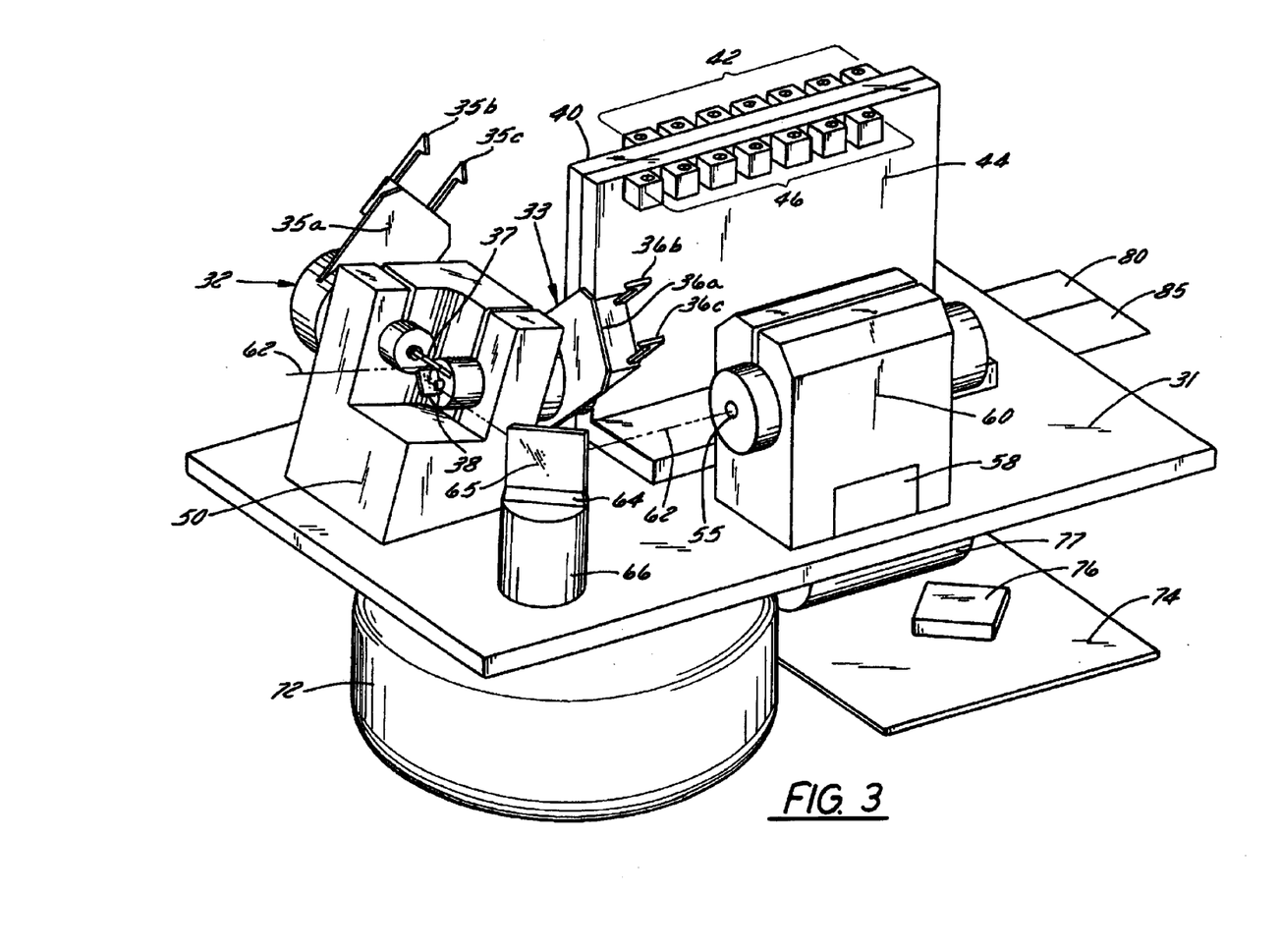
FIG. 3 is a perspective view of the projector of the system of present invention with parts removed to show the internal components.

FIG. 3 illustrates some of the internal components of projector 30. Mounted on plate 31 are the scanners 32, 33. Scanners 32, 33 are made up a variety of components in addition to the scanner drivers 34a, 34b. For example, x-axis scanner 32 has a scanner bracket 35a protruding therefrom. A pair of bracket plug hooks 35b, 35c are attached to bracket 35a. Similarly, a pair of bracket plug hooks 36b, 36c are attached to bracket 36a. A mirror 37 is connected to the x-axis scanner 32. Similarly, a mirror 38 is connected to the y-axis scanner 33.

Wires (not shown) connect the hooks 35b, 35c, 36b, 36c to scanner driver cards 40,44. The wires are actually connected to potentiometers 42,46 located on scanner driver cards 40,44. The potentiometers 42,46 are preferably adjustable. The scanner driver cards 40,44 are preferably CB6788 Cambridge scanner driver cards also available from Cambridge Technology, Inc.

Scanners 32, 34 are mounted on scanner mount 50 which in turn is mounted on plate 31. Scanner mount 50 is available from Lowell Products Development (LPD) of Maryville, Wash.

Geometric correction card 27 and geometric signal conditioner 25 are used to electronically adjust scanners 32, 34. This is done by an operator using one of sixteen knobs on geometric conditioner 25. Each axis (X and Y) has eight knobs. The knobs can adjust for keystone, shear, linearity, scale, pincushion, bowline, centering, or offset. In one preferred embodiment the knobs are replaced by an integral computer controller (not shown).

Light source 55 is preferably a BWL-10 mwatt, diode pumped solid state (DPSS) laser module with a collimating optic. Preferably, the laser is a diode laser which emits light having a 555 nanometers wavelength (i.e., green light). Light source 55 is powered by power source 58. Power source 58 is preferably a BWD 800 power supply or its equivalent. The preferred light source 55 and power supply 58 are available from B&W Tek, Inc., Newark, Del. The light source 55 and power source 58 are contained in laser housing 60 which is preferably constructed out of aluminum or any other sufficiently strong, lightweight material.

A laser is the preferred light source because unlike other conventional light sources it is monochromatic, has directionality, and the light is coherent. The laser is a light source that produces a dot of light. The scanners move that dot of light onto a plane. In the present invention, the laser draws a first image, and then a second image is drawn. A dot of light is created by this process which connects those two images, unless it is either mechanically blanked, optically blanked, or blanked by the laser turning on and off at a fast rate. In the preferred embodiment, a diode laser is used because it has the ability to rapidly modulate (i.e. turn on and off). Such a laser can be rapidly be turned off at the images' connecting points is so that this connection is effectively blanked out.

One preferred embodiment uses a laser which emits light having a wavelength of 555 nanometers (nm). This wavelength is easily sensed by the human eye. However, a laser having a wavelength of 532 nm may also be used. 532 nm lasers are readily commercially available, as opposed to, 555 nm lasers. Lasers having a 532 nm wavelength in this range are green in color which is easily detected by the eye in conventional ambient office light conditions. The green lines projected by the laser generally do not compete with the ambient white light. This reduces the fatigue on the user's eyes and allows the tracing to be accomplished more rapidly.

Even though green lasers are used, in typical retrofit situations the room is illuminated with backlit white lights because there are still some workers in the facility. If the person doing the tracing is constantly staring right at the white ambient light sources, he is distracted and uncomfortable. Thus, the white ambient lights may be shaded for any particular installation by a piece of foil. The foil covers the light and reflects it down onto the floor, as opposed to shining it directly onto the ceiling, which effectively amplifies the light because the ceiling is light in color. Alternatively, the lights may be electronically subdued by a dimmer switch. Both reduce the glare up into the ceiling which is the work surface and reduce the fatigue experienced by the worker doing the tracing.

As shown in FIG. 3, light 62 from light source 55 is emitted and travels to a main mirror 65 which is mounted an adjustable block 64 often referred to as an MM1. Mirror 65 is mounted on a post 66 located preferably not far from laser housing 60. Preferably, light 62 is reflected off mirror 65 and onto scanner mirror 38. Light 62 is reflected off mirror 38 and onto mirror 37. Light 62 is then emitted from the projector 30 onto the work surface (not shown). Block 64, mirror 65, and post 66 are available from LPD of Maryville, Wash.

Connected to the underside of plate 31 is unregulated power supply 70. Unregulated power supply 70 is constructed of a multitude of components including: transformer 72, circuit board 74, bridge rectifier 76, and capacitor 77. Transformer 72 is preferably toroidal transformer. Moreover, a basic bridge rectifier is preferred. Further, in one preferred embodiment, a pair of electrolytic capacitors smooth out the current ripple to give system 5 a smooth DC voltage.

Power supply 70 is connected to an outside DC supplying power unit by power connector 80 which is preferably a male Edison inset receptacle flange 110-volt connector available from Hubbell Incorporated.

Projector 30 is connected to the geometric signal conditioner 25 by connector 85. Preferably connector 85 is a female AMP 37-pin CPC connector, part #206306-1 available from AMP Incorporated.

Typically the power supply and the other internal components of projector 30 are enclosed by an enclosure or cover constructed aluminum. However, this cover has been removed in FIG. 3 for clarity.

A variety of software is utilized by system 5. The preferred software includes: Pangolin, Version 2.86 laser show designer software available from Laser Systems, Inc., Orlando, Fla.; Spectra Scan II Version 1.2.16 Win 95 LD graphic converter software available from all Holo-Spectra, Inc., Van Nuys, Calif.; AutoCAD® R14 software available from AUTOCAD which is used to create a DXF file, or alternatively software which may be used to create a bitmap (BMP) file such as Corel® Draw, Adobe®, or Photoshop®; and Microsoft Windows® 95 software.

The laser projection software loaded in the computer encodes the CAD file into a laser data file format. The software with the aid of a computer card converts this digital laser data file information into an analog signal for output. The analog signal is then transmitted to a geometric signal conditioner. The geometric signal conditioner then transmits the analog signal to a laser projector. These analog signals control positioning of scanners within the laser projector and modulation of the laser light by on/off switching. The ability to modulate the diode laser eliminates the retrace lines of two or more unconnected images.

At the work site, there may be a variety of obstacles for example a fire sprinkler systems, a wall, or desk. Therefore, the equipment of system 5 must be mobile and flexible. For example, projector 30 is preferably is about the size of a bread box or a shoe box. Projector 30 is also preferably mounted on a tripod. Projector 30 is set up as close to the centering point as possible. A grid pattern is then projected onto the work surface, for example, the ceiling. In one preferred embodiment, the system operator typically sits upon a chair with wheels. Further, computer 10 is mounted on coasters or wheels, as is geometric signal conditioner 25. Projector 30 is preferably provided with a tripod having telescopic legs. The wheels, coasters, and tripod legs add mobility, flexibility, and portability to system 5. For example, the telescopic legs allow one leg to rest on an obstruction such as a desk, while the other two legs rest on the floor.

Figure 4:
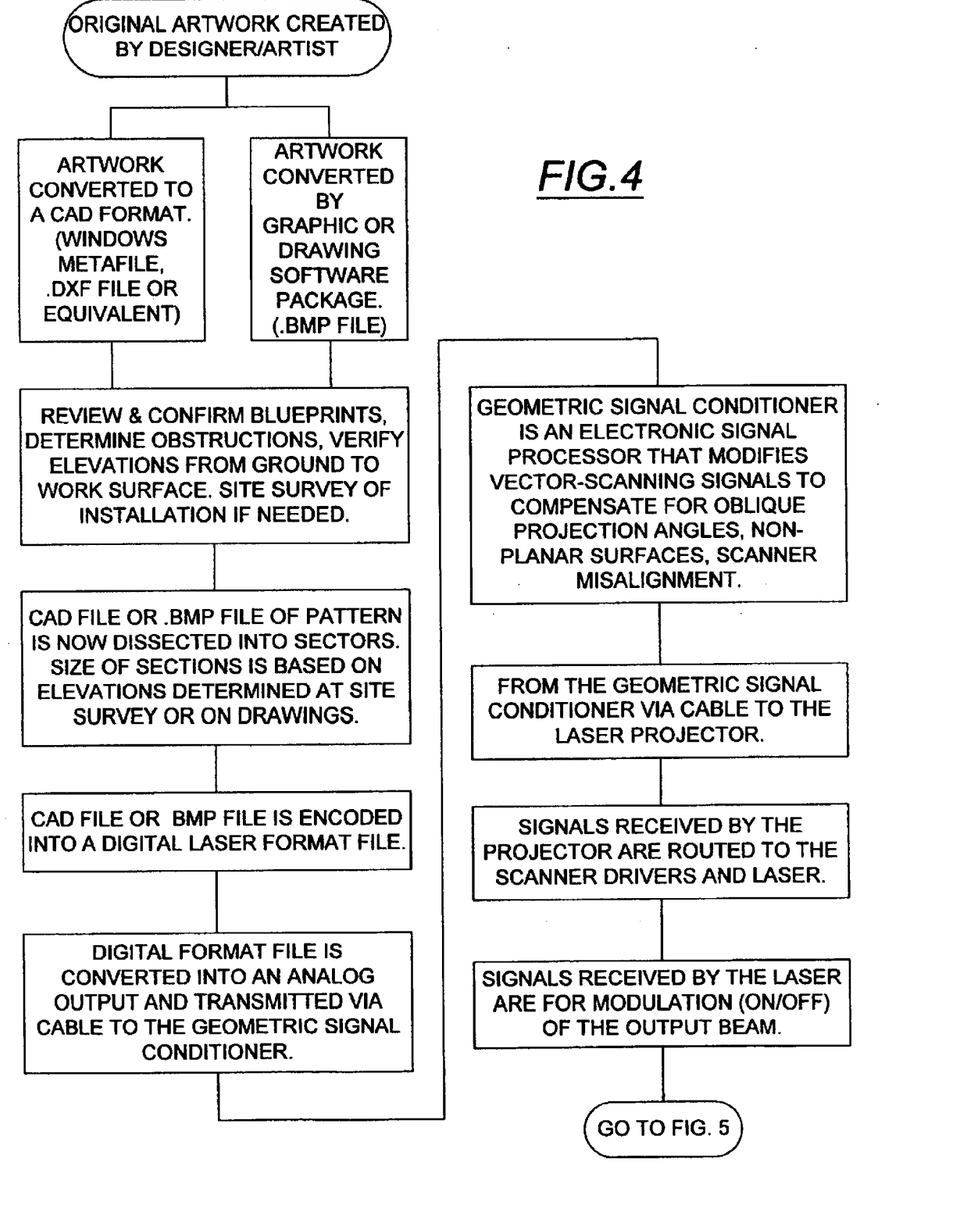
FIG. 4 is a flow chart illustrating the steps of the system of the present invention.
Figure 5:
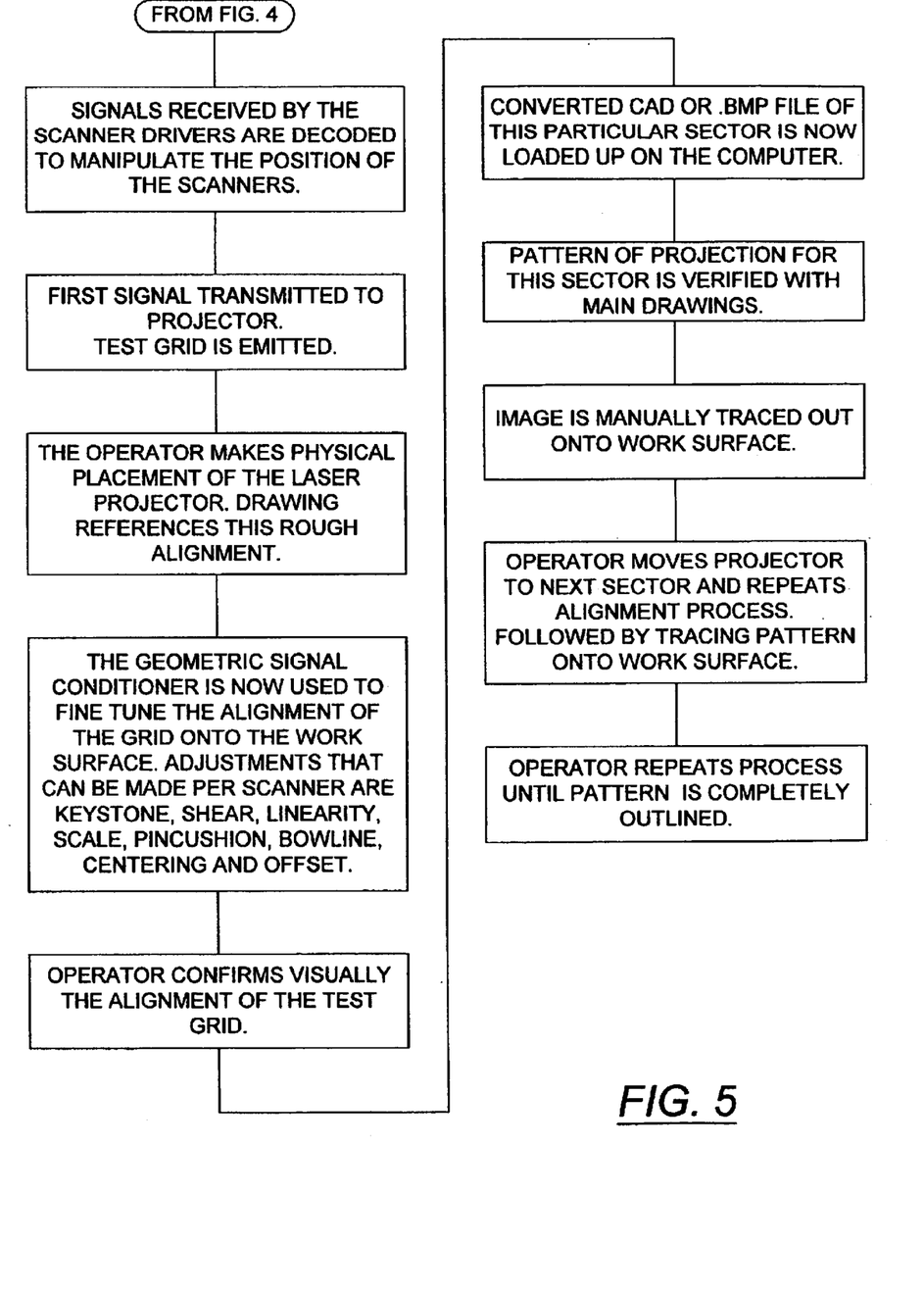
FIG. 5 is a flow chart which continues from FIG. 4 in illustrating the steps of the system of the present invention.

FIG. 4 and FIG. 5 are flow charts illustrating some of the key steps of the present invention. In one preferred embodiment, i.e., method for operating the system 5 comprises the steps of: creating a pattern for projecting on a work surface, converting the pattern to a CAD format, examining construction site blueprints to determine obstructions, verifying elevations, and surveying the installation site. Preferably, the next steps include: dissecting CAD file of pattern into sectors which allow for workable elevations determined by the site survey or blueprint, converting the CAD file to a digital laser file format, and converting to digital file format to an analog file. In one embodiment, the on-site steps include: transmitting the analog signal to a geometric signal conditioner; processing signals to compensate for oblique projection angles, non-planar services, and projector scanner misalignment; transmitting the analog signals produced by the geometric signal conditioner to the projector; outputting the signals in the projector to the scanner drivers and a laser; modulating the laser output as required; manipulating the position of the scanners as required; projecting the test grid from the projector; aligning the projector in accordance with the test grid; fine-tuning the grid on a work surface through adjustments to the geometric signal conditioner; and visually confirming the alignment of the test grid on the work surface. Once the testing is complete, preferably the next steps include: converting the CAD file of a particular sector and a loading it into the computer, verifying the pattern projected for a particular sector with the blueprint, manually tracing the image projected as part of the pattern on a work surface, moving the projector to the next sector, repeating the above steps until the entire pattern is completely outlined, and cutting the traced pattern to produce a structure. After the pattern is cut, the excess is removed from the cut shape and discarded. Edging may then be used to frame and stabilize the pattern. Preferably, the edging is constructed of extruded aluminum.

Figure 6:
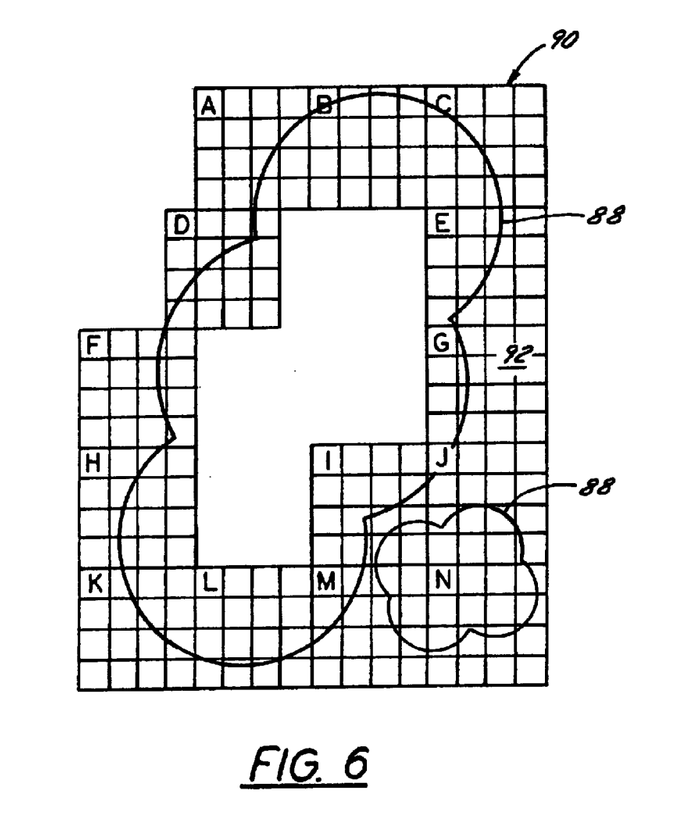
FIG. 6 is a bottom up view showing a pattern superimposed on a grid in the system of the present invention which has been divided into workable sectors within a work area.
Figure 7:
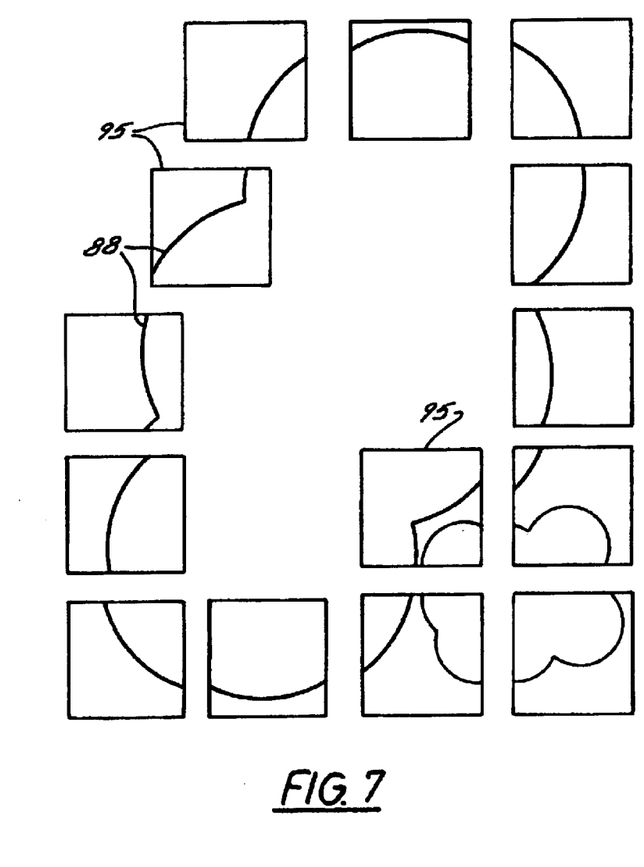
FIG. 7 is an exploded view showing the sectors of FIG. 6 exploded outwardly to illustrate how the pattern is projected into a specific sector of a work surface.

FIG. 6 shows a pattern 88 superimposed onto a work surface 90 having a grid 92 which has been divided into easily workable sectors 95. FIG. 7 shows the sectors 95 of FIG. 6 exploded outwardly to illustrate how the pattern 88 will be projected onto a specific sector 95 of the work surface 90. For example, if the work surface is a ceiling, it may have its own grid made up of aluminum ceiling girders. After, work surface 90 is then broken into sectors 95, projected grid 92 of system 5 may be aligned with these girders within a sector 95 to pin point or target a reference or center point. In the preferred embodiment, system 5 may provide accurate placement of a created structure 98 to plus or minus a quarter of an inch or less by using this sector system.

Generally, the size of the laser-projected image is based on a ratio of distance/image size, with a minimum image ratio of 1:1. This means for example, that if the projector is 10 feet from the work surface the maximum size an image can be is 10 feet. So if the pattern created in the original CAD file were larger than 10 feet in either the X or Y-axis then the image would need to be divided into multiple sectors. Each sector will then need to be converted into a file format readable by the laser projector.

Figure 8:
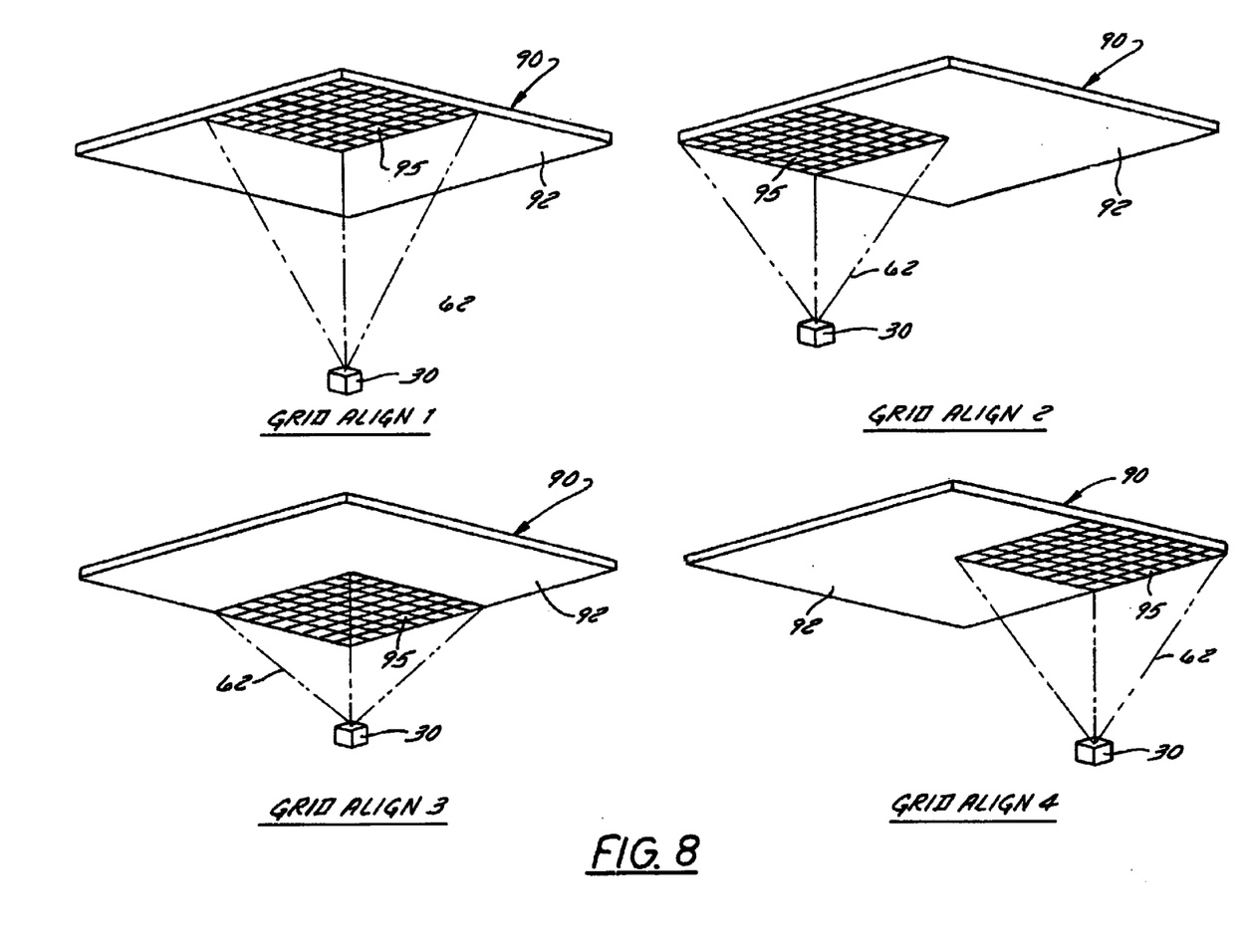
FIG. 8 is a schematic illustrating how the projector of FIG. 2 must be moved along a work surface in order that it may be properly aligned for projection.
Figure 9:
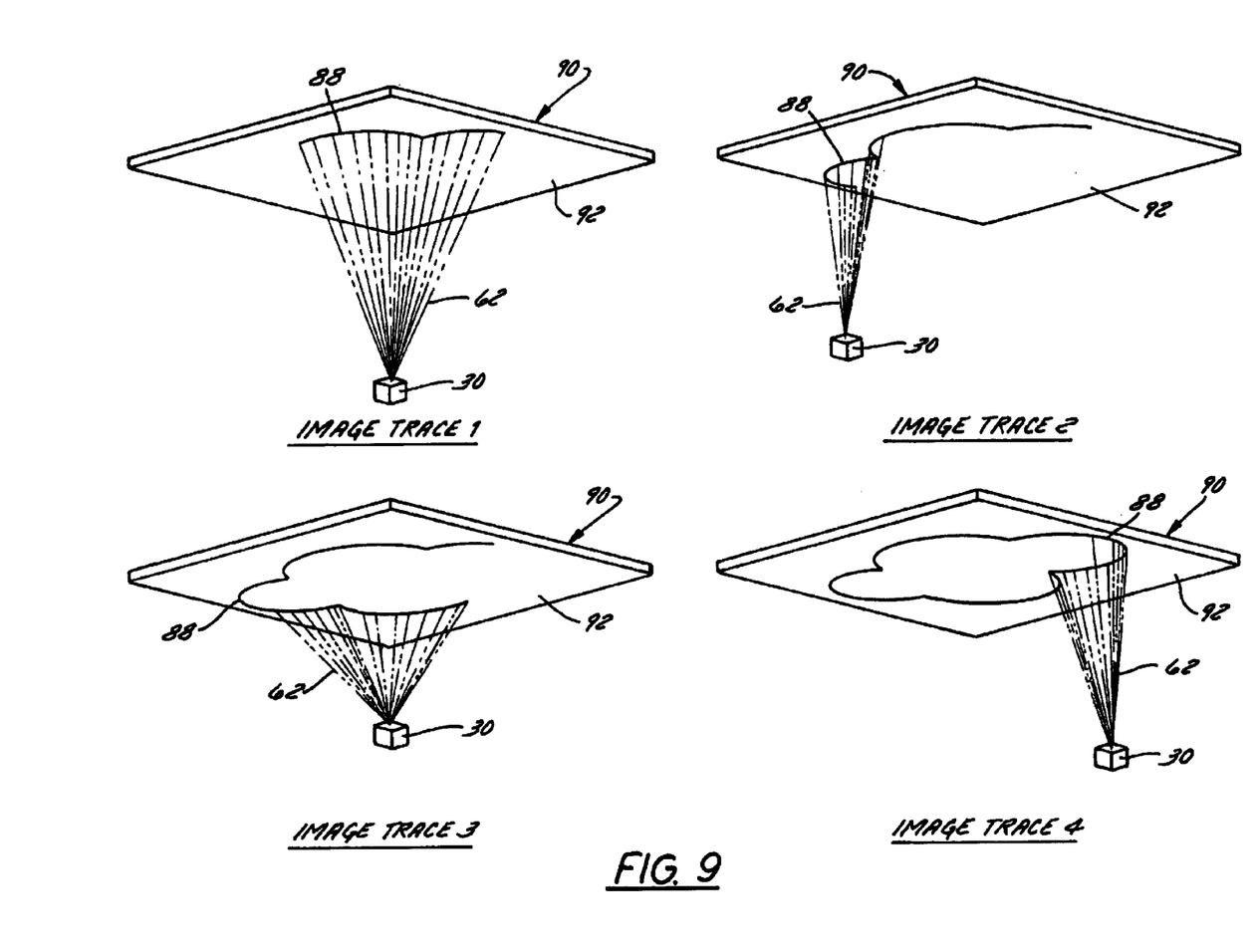
FIG. 9 is a schematic illustrating how an image pattern is projected by the projector of FIG. 2 upon the work surface and traced in various sectors within the work area to complete the pattern.
Figure 10:
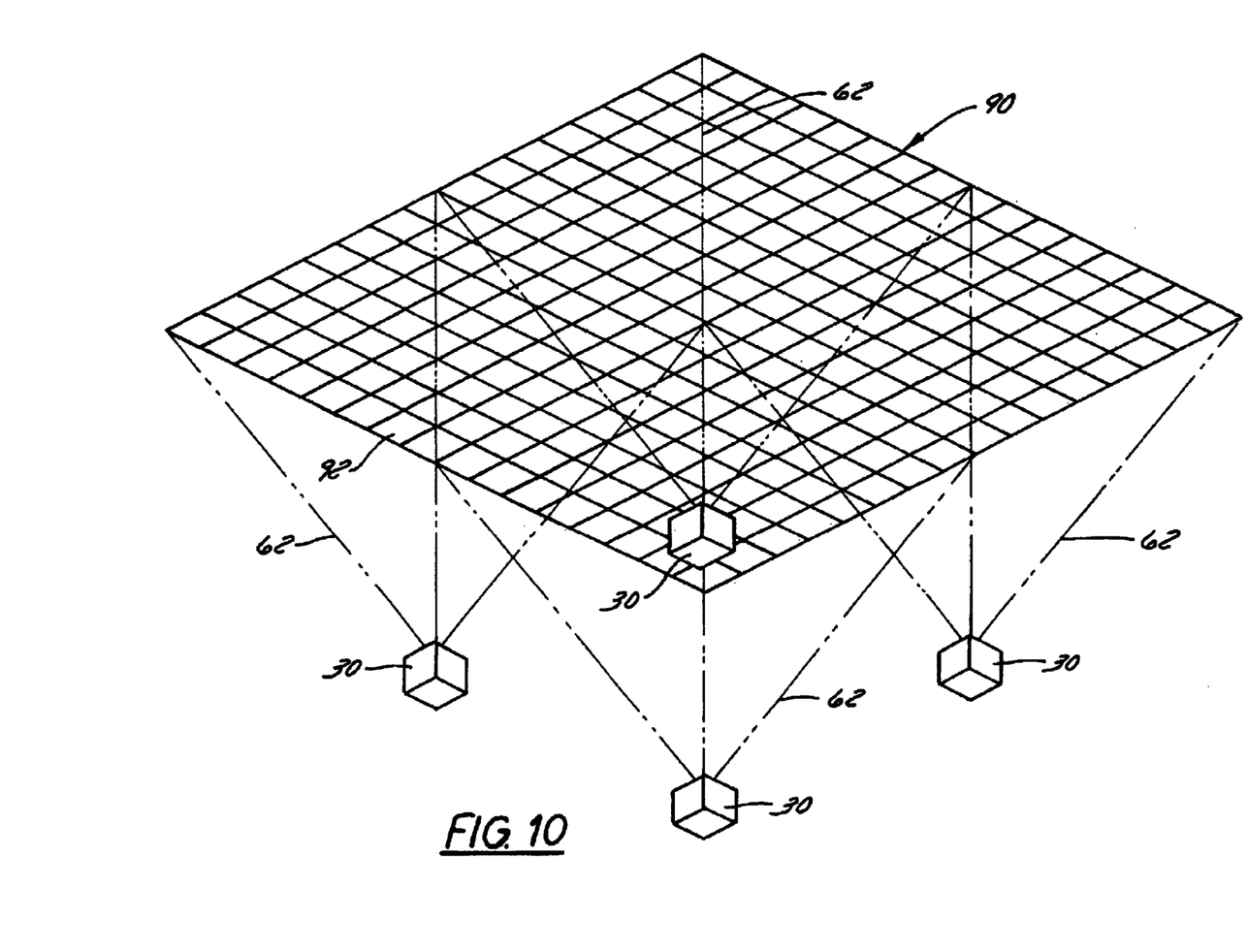
FIG. 10 is a schematic showing how multiple projectors may be used with the system of the present invention to project a grid on an entire work surface.
Figure 11:
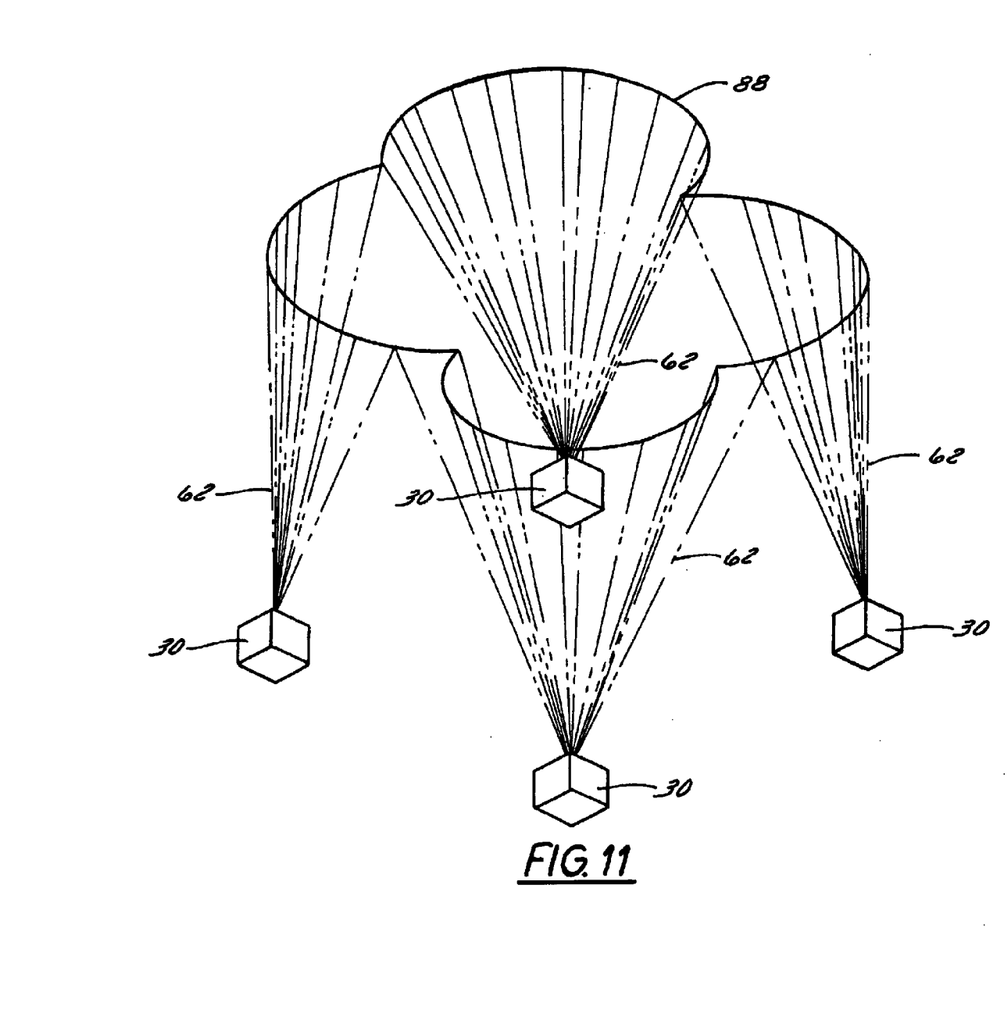
FIG. 11 is a schematic showing how multiple projectors can be used with the system of the present invention to project an entire image pattern upon a work surface.

FIG. 8 illustrates how projector 30 must be moved along under the work surface 90 in order that it may be properly aligned for projection. FIG. 9 illustrates how pattern 88 is projected by projector 30 upon the work surface 90 and traced in the various sectors 95 to complete pattern 88. FIG. 10 shows that multiple projectors 30 may be used to project a grid 92 over an entire work surface 90. FIG. 11 shows how multiple projectors can be used to project in entire pattern 88 upon work surface 90.

Figure 12:
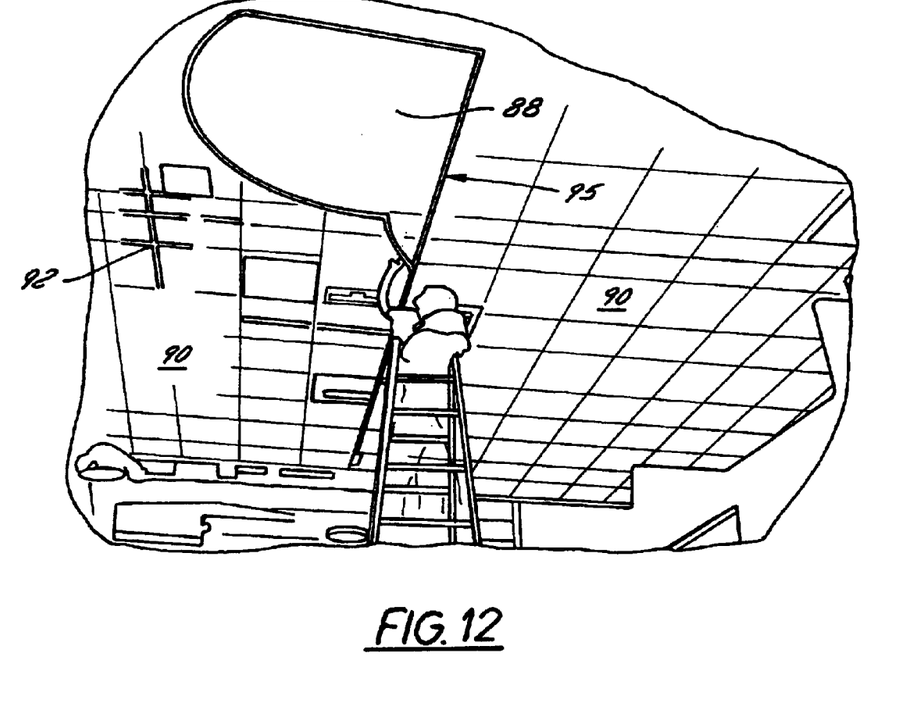
FIG. 12 is a schematic showing how a portion of a pattern may be projected by the system of the present invention onto a certain sector of the work surface and manually traced.
Figure 13:
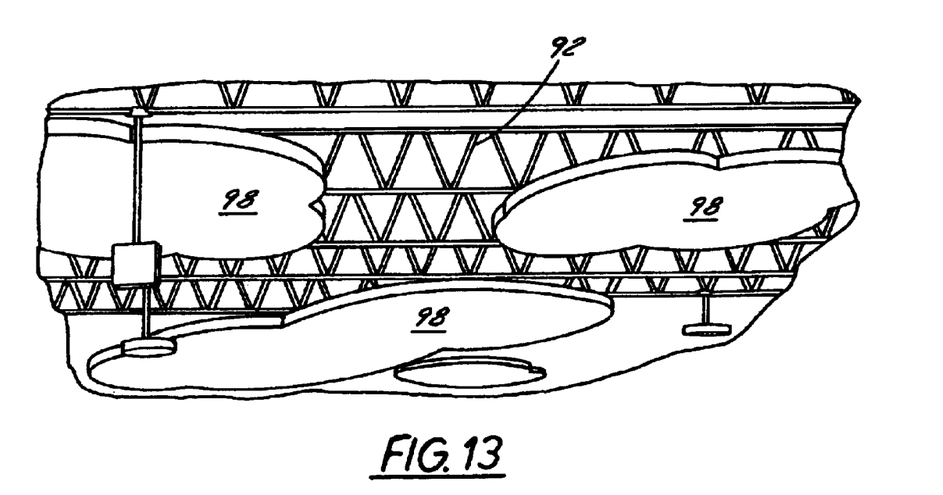
FIG. 13 is a schematic showing an example of structures produced using the system of the present invention.

FIG. 12 shows a portion of the pattern 88 projected onto a certain sector 95 of the work surface 90 and manually traced. FIG. 13 shows an example of the type of structures 98 which may be produced using the system of the present invention. For example, the structures 98 may be clouds.

The disclosed embodiment shows a computer 10 as the structure for performing the function of converting the drawing files, but the structure for converting can be any other structure capable of performing the converting function, including, a mere motherboard having a simple processor and a memory.

Conveniently, system 5 of the present invention can be made of any material. For the manufacturing operation, it is moreover an advantage to employ a plastic material as alternative to aluminum for economy and cost and weight savings. Also, generally, any focusable light source may be used for the needed light projection, for example, it is possible to get a similar effect by projecting light through fish eye lenses, holographic lenses, or special lenses having etched grids.

All the disclosed embodiments are useful in conjunction with the construction of ceiling structures, such as clouds (as shown in FIGS. 12 and 13) for the purpose of decorating ceilings or the like. Of course, beyond decorative ceiling structures, there are virtually innumerable uses for the present invention, all of which need not be detailed here. For example, the invention may be used to design structures or murals for walls. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although the computer, geometric conditioner and projector are described herein as physically separate modules, it will be manifest that they may be integrated into any part with which they are associated. Furthermore, all the disclosed features of each disclosed embodiment can be combined with, or substituted for, the disclosed features of every other disclosed embodiment except where such features are mutually exclusive.

The terms upper lower, top, bottom and the like in the specification and claims are intended to assist the reader in understanding invention and are not intended as terms of limitation.

It is intended that the appended claims cover all such additions, modifications and rearrangements. Expedient embodiments of the present invention are differentiated by the appended subclaims.

We claim:

1. A method of projecting light on a planar surface to produce an image for tracing comprising the steps of:
    creating a pattern;
    providing
        a projector having a light source;
        a signal conditioner operably connected to the projector;
        a computer operably connected to the signal conditioner;
        a scanner operably connected to the projector;
        a test pattern emanating from the projector for visually aligning an image to a sector;
        a grid operably aligned with the planar surface; and
        a geometric pattern projected on the planar surface;
    tracing lines along the pattern on the planar surface;
    cutting the pattern along the traced lines;
    discarding pieces of the planar surface outside the pattern; and
    placing edging along an outer edge of the pattern.

2. An apparatus for projecting light on a planar surface comprising:
    a projector having a light source;
    a signal conditioner operably connected to the projector;
    a computer operably connected to the signal conditioner;
    a scanner operably connected to the projector;
    a test pattern emanating from the projector for visually aligning an image to a sector;
    a grid operably aligned with the planar surface; and
    a geometric pattern projected on the planar surface.

3. The apparatus of claim 2, wherein the computer further includes computer aided design software.

4. The apparatus of claim 2, wherein the computer further includes light source data file.

5. The apparatus of claim 2, wherein the computer further includes light source control software.

6. The apparatus of claim 2, wherein the computer further includes third party conversion software which converts the computer's digital information into analog information for use with a scanner.

7. The apparatus of claim 2, wherein the light source is a laser having a wavelength between 551 nanometers and 530 nanometers.

8. The apparatus of claim 2, wherein the light source is a diode laser.

9. The apparatus of claim 2, wherein the light source is a diode laser having a wavelength of 532 nanometers.

10. The apparatus of claim 2, wherein the computer is capable of generating multiple sectors on the planar surface.

11. A system for projecting light on a work surface to produce a structure comprising the steps of:
    creating a pattern for projecting on a work surface;
    converting the pattern to a computer aided design (CAD) format;
    examining construction site blueprints to determine obstructions;
    surveying the site;
    verifying elevations at the site;
    dissecting CAD file of pattern into sectors which allow for workable elevations determined by
    the site survey or blueprint;
    converting the CAD file to a digital laser file format;
    converting to the digital file format to an analog file;
    transmitting the analog signal to a geometric signal conditioner;
    processing signals to compensate for oblique projection angles, nonplanar services, and projector scanner misalignment;
    transmitting the analog signals produced by the geometric signal conditioner to a projector;
    outputting the signals in the projector to scanner drivers and a laser;
    modulating the laser output as required;
    manipulating the position of the scanners as required;
    projecting a test grid from the projector;
    aligning the projector in accordance with the test grid;
    fine-tuning the grid on a work surface through adjustments to the geometric signal conditioner;
    visually confirming the alignment of the test grid on the work surface;

converting the CAD file of a particular sector and a loading it into a computer;

verifying the pattern projected for a particular sector with the blueprint;

manually tracing the image projected as part of the pattern on the work surface;

moving the projector to the next sector; and repeating the above steps until an entire pattern is completely outlined.

12. A method for projecting light on a work surface to produce a structure comprising the steps of:

conducting a site survey to determine dimensions of a work surface available for projection of light and to determine a distance from the work surface to possible locations where a projector may be established;

reviewing a blueprint to determine the physical parameters that an installation site;

dissecting a drawing completed on a computer and a blueprint into usable portions to ensure for the physical limitations of the projector's scanners;

surveying the installation site to physically verify that the blueprint is accurate;

producing a grid to correspond with the room's physical dimensions and the work surface's area;

turning the grid off to ensure that the projected light does not flicker, that there is less information for the scanner to project onto the work surface, and that there is less interfering background light for an operator who must trace the pattern to form a structure; and ensuring that all dimensions are accurate so that an extruded aluminum edging fits properly around the structure.

13. The apparatus of claim 12, wherein the computer further includes computer aided design software.

14. The apparatus of claim 12, wherein the computer further includes light source data file.

15. The apparatus of claim 12, wherein the computer further includes light source control software.

16. The apparatus of claim 12, wherein the computer further includes third party conversion software which converts the computer's digital information into analog information for use with a scanner.

17. The apparatus of claim 12, wherein the light is a laser having a wavelength between 551 nanometers and 530 nanometers.

18. The apparatus of claim 12, wherein the light is a diode laser.

19. The apparatus of claim 12, wherein the light is a diode laser having a wavelength of 532 nanometers.

20. The apparatus of claim 12, wherein the computer is capable of generating multiple sectors on the planar surface by the use of multiple projectors.

* * * * *